US010055739B2

(12) United States Patent
Chiang et al.

(10) Patent No.: US 10,055,739 B2
(45) Date of Patent: Aug. 21, 2018

(54) SYSTEM AND METHOD FOR PRICING AND EXCHANGING CONTENT

(75) Inventors: Mung Chiang, Princeton, NJ (US); Hazer Inaltekin, Coburg (AU); H. Vincent Poor, Princeton, NJ (US)

(73) Assignee: The Trustees of Princeton University, Princeton, NJ (US)

(*) Notice: Subject to any disclaimer, the term of this patent is extended or adjusted under 35 U.S.C. 154(b) by 222 days.

(21) Appl. No.: 13/120,047

(22) PCT Filed: Oct. 6, 2008

(86) PCT No.: PCT/US2008/078925
§ 371 (c)(1),
(2), (4) Date: Jun. 3, 2011

(87) PCT Pub. No.: WO2010/042100
PCT Pub. Date: Apr. 15, 2010

(65) Prior Publication Data
US 2011/0238505 A1    Sep. 29, 2011

(51) Int. Cl.
*G06Q 30/00* (2012.01)
*G06Q 30/02* (2012.01)
*G06Q 30/06* (2012.01)
*G06Q 40/00* (2012.01)

(52) U.S. Cl.
CPC ......... *G06Q 30/00* (2013.01); *G06Q 30/0273* (2013.01); *G06Q 30/0601* (2013.01); *G06Q 40/00* (2013.01)

(58) Field of Classification Search
CPC .................................. G06Q 30/0207
USPC ..................................... 705/52, 14
See application file for complete search history.

(56) References Cited

U.S. PATENT DOCUMENTS

| 5,794,210 | A  | * | 8/1998  | Goldhaber ......... G06Q 30/0207 |
|           |    |   |         | 705/14.69                       |
| 7,937,362 | B1 | * | 5/2011  | Lian ...................... G06Q 10/00 |
|           |    |   |         | 707/622                         |
| 2001/0044781 | A1 | * | 11/2001 | Shutes ............................ 705/59 |
| 2001/0056413 | A1 | * | 12/2001 | Suzuki et al. ................. 705/418 |
| 2002/0062285 | A1 | * | 5/2002  | Amann ................ G06Q 20/102 |
|           |    |   |         | 705/43                          |
| 2003/0115126 | A1 | * | 6/2003  | Pitroda .......................... 705/36 |

(Continued)

FOREIGN PATENT DOCUMENTS

WO    WO 2010/042100 A1    4/2010

OTHER PUBLICATIONS

Adar, et al., "Free Riding on Gnutella," Technical Report, Xerox PARC, Palo Alto, CA, Aug. 2000 (22 pages).

(Continued)

*Primary Examiner* — Matthew L Hamilton
(74) *Attorney, Agent, or Firm* — McCarter & English, LLP

(57) ABSTRACT

A system and method for pricing and exchanging content is provided, which includes a data plane formed by a peer-to-peer content sharing network or a central server allowing for client-server content transfers, and a control plane formed by a central server in communication with the data plane via the Internet. The data plane allows for the storage of digital content provided by users and the transfer of content therebetween, and the control plane provides a virtual market in which such content is sold between users using virtual currency that can be exchanged for real currency.

16 Claims, 15 Drawing Sheets

(56) References Cited

U.S. PATENT DOCUMENTS

| | | | |
|---|---|---|---|
| 2004/0059679 A1* | 3/2004 | Mizumachi et al. | 705/52 |
| 2005/0149340 A1* | 7/2005 | Murakami et al. | 705/1 |
| 2005/0165640 A1* | 7/2005 | Kotorov | G06Q 30/02 705/14.16 |
| 2005/0240536 A1 | 10/2005 | Davis et al. | |
| 2005/0246273 A1 | 11/2005 | Farley | |
| 2005/0246282 A1* | 11/2005 | Naslund et al. | 705/52 |
| 2006/0004659 A1 | 1/2006 | Hutchison et al. | |
| 2006/0020960 A1* | 1/2006 | Relan | G06F 17/30017 725/30 |
| 2006/0053077 A1* | 3/2006 | Mourad et al. | 705/51 |
| 2006/0112016 A1* | 5/2006 | Ishibashi | 705/52 |
| 2006/0167819 A1* | 7/2006 | Bhambri et al. | 705/64 |
| 2006/0215575 A1* | 9/2006 | Horton | H04L 43/0817 370/252 |
| 2006/0265467 A1* | 11/2006 | Jang | G06F 17/30206 709/216 |
| 2006/0282309 A1* | 12/2006 | Zhang | G06Q 30/02 705/14.1 |
| 2007/0100777 A1* | 5/2007 | Floyd | G06Q 30/02 705/400 |
| 2007/0136126 A1* | 6/2007 | Notani et al. | 705/10 |
| 2007/0165805 A1 | 7/2007 | Altberg et al. | |
| 2007/0226368 A1* | 9/2007 | Strickland | G06Q 30/02 709/243 |
| 2007/0239839 A1* | 10/2007 | Buday | H04L 65/4015 709/208 |
| 2008/0215434 A1 | 9/2008 | Jung et al. | |
| 2008/0235332 A1* | 9/2008 | McChesney | G06Q 30/02 709/204 |
| 2008/0307094 A1* | 12/2008 | Karonen | H04L 41/0896 709/226 |
| 2009/0006187 A1* | 1/2009 | Marcuvitz | 705/10 |
| 2009/0012875 A1* | 1/2009 | Zanini et al. | 705/26 |
| 2009/0210328 A1* | 8/2009 | Fomenko | G06F 21/10 705/30 |
| 2009/0240629 A1* | 9/2009 | Xie et al. | 705/80 |
| 2009/0271309 A1* | 10/2009 | Gordon et al. | 705/37 |
| 2010/0070377 A1* | 3/2010 | Williams et al. | 705/26 |
| 2010/0333129 A1* | 12/2010 | Alhadeff et al. | 725/27 |

OTHER PUBLICATIONS

Cohen, "Incentives Build Robustness in BitTorrent," Workshop on Ecomonics of Peer-to-Peer System (P2PEcon'03), Berkeley, CA, (2003) (5 pages).

Axelrod, et al., "The Evolution of Cooperation," Science, vol. 211, No. 27, Mar. 1981 (7 pages).

Liogkas, et al., "Exploiting BitTorrent for Fun (But Not Profit)," Proceedings of the International Workshop on Peer-to-Peer Systems (IPTPS), 2006 (6 pages).

Sirivianos, et al., "Free-Riding in BitTorrent Networks With the Large View Exploit," Proceedings of the 6th International Workshop on Peer-to-Peer Systems (IPTPS), 2007 (6 pages).

Ramachandran, et al, "BitStore: An Incentive-Compatible Solution for Blocked Downloads in BitTorrent," Proceedings of 2nd Joint Workshop on Economics of Networked Systems and Incentive-Based Computing, 2007 (7 pages).

Freedman, et al., "Prices are Right: Managing Resources and Incentives in Peer-Assisted Content Distribution," Proceedings of IPTPS, 2008 (6 pages).

Sirivianos, et al, "Dandelon: Cooperative Content Distribution With Robust Incentives," Proceedings of USENIX, 2007 (14 pages).

Vishnumurthy, et al., "KARMA: A Secure Economic Framework for Peer-to-Peer Resource Sharing," Proceedings of the Workshop on the Economics of Peer-to-Peer Systems, 2003 (6 pages).

International Search Report of the International Searching Authority dated Dec. 9, 2008, issued in connection with International Patent Appln. No. PCT/US08/78925 (4 pages).

Written Opinion of the International Searching Authority dated Dec. 9, 2008, issued in connection with International Patent Appln. No. PCT/US08/78925 (5 pages).

* cited by examiner

SYSTEM AND METHOD FOR PRICING AND EXCHANGING CONTENT

GOVERNMENT RIGHTS

The present invention was made with government support under National Science Foundation Grant Nos. 0720570 and 0625637. Accordingly, the government has certain rights to the present invention.

BACKGROUND OF THE INVENTION

Field of the Invention

The present invention relates to online content trading systems, and more particularly, to a system and method for pricing and exchanging content.

Related Art

Various online systems have been developed for exchanging digital content, such as music files, pictures, video files, documents etc. Such systems are implemented either as classic client-server type networks or as peer-to-peer networks, wherein one user (a peer) shares content stored locally on his or her computer system with another user (another peer) in the same network. Examples of content sharing networks include BitTorrent, Gnutella, Napster, iTunes, YouTube, Knol, and BitStore. BitTorrent and Gnutella depend on peer-to-peer technology, and provide a digital "barter" economy, wherein access to a user's content is provided to another user in exchange for access to the other user's content. Napster and iTunes depend on client-server technology, and allow for paid access to content through a central website, e.g., the Napster and iTunes websites. These sharing networks provide licensed content to users in exchange for money. YouTube, which depends on client-server technology, is a digital video sharing website, wherein video clips are uploaded by users to a central website and can be viewed by (broadcasted to) other users, free of charge. BitStore is a proposed enhancement to BitTorrent, wherein the idle storage space of users is used to store pieces of unpopular content.

Other content sharing networks utilize credits as a basis for exchanging content. For example, Knol is an information sharing system provided by Google, which allows for sharing of articles amongst users and which attaches "credits" to article authors. However, these credits cannot be exchanged for real currency. Also, credits are only given to users, and are not attributed to content in the form of tokens.

The concept of using virtual currency in a virtual "world" (i.e., an online environment that mimics real life) is known. One example is the Internet-based virtual world called Second Life, which allows individuals to create virtual presences ("avatars") which interact with other users of the system and which carry out actions in the virtual world that mimic real-life actions. This system implements a virtual currency system, wherein virtual items and services can be bought and sold using virtual currency. The virtual currency can be exchanged for real currency, according to an exchange rate.

SUMMARY OF THE INVENTION

The present invention relates to a system and method for pricing and exchanging content. The present invention includes a data plane formed by a peer-to-peer content sharing network, and a control plane formed by a central server in communication with the peer-to-peer content sharing network of the data plane via the Internet. The data plane can also be implemented using a central server which stores digital content provided by users (e.g., pictures, movies, audio files, documents, etc.) and allows for content exchange in client-server mode, or in a distributed fashion where the peer-to-peer network allows for local storage of digital content provided by users. The control plane provides a virtual market in which such content is sold between users using virtual currency that can be exchanged for real currency. Content generated by users is positively valued, and can be sold to other users in exchange for a quantity of virtual currency specified by the user generating the content. The content could be sold in an auction, whereby bids are placed on the content, or it could be sold using a marked price transaction, whereby the content is sold at a predetermined fixed price. Virtual currency obtained by selling the content can be used to purchase additional content, or exchanged for real money. Advertisements are negatively valued, such that advertisers must pay virtual currency to an operator of the present invention to place an advertisement, and each user who accesses the advertisement is paid a pre-defined amount of virtual currency for viewing the advertisement, which is deducted from the total amount of virtual currency paid by the advertiser to place the advertisement. The present invention balances content having positive value (i.e. non-advertisement content generated by users) with negatively-valued content (i.e., advertisements), and enhances user participation in content sharing networks (beyond a simple protocol-level enhancement). Users of the present invention can thus generate virtual income by selectively viewing advertisements, as well as by selling content. Copyright holders can automatically be paid a royalty in virtual currency whenever a work is exchanged between users.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a system and method for pricing and exchanging content, which will be described in detail below with reference to FIGS. 1-13.

Figure 1:
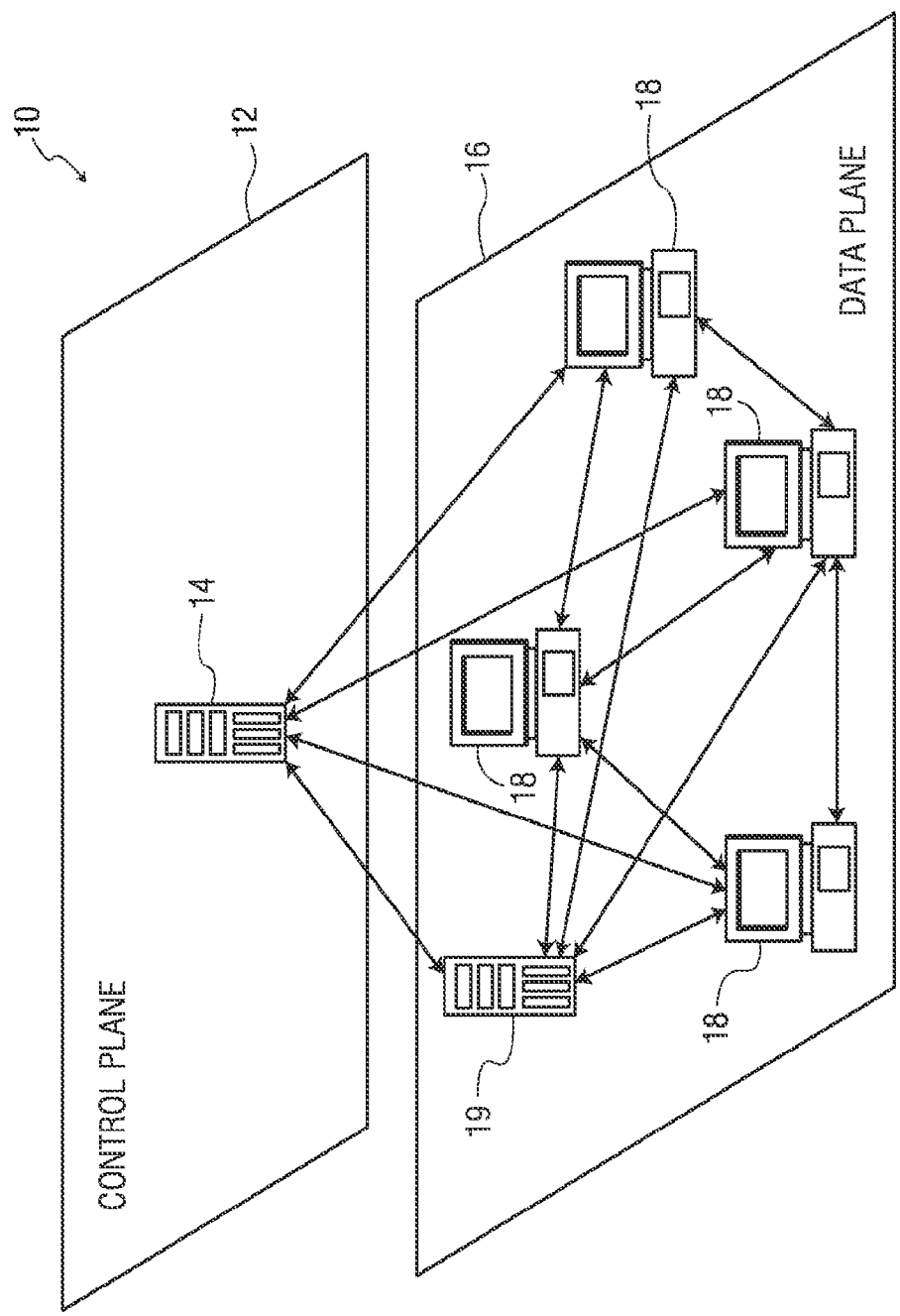
FIG. 1 is a diagram showing hardware components of the present invention.

FIG. 1 is a diagram showing hardware components of the content pricing and exchanging system 10 of the present invention. The system 10 includes a control "plane" or network 12 comprising a central server 14, and a data "plane" or network 16 which comprises a peer-to-peer network of computing nodes 18. The central server 14 and the peer-to-peer network nodes 18 are connected to the Internet, and communicate through it using known communications protocols, such as TCP/IP, UDP, etc. The nodes 18 form a peer-to-peer network which allows for local storage of digital content (e.g., pictures, movies, audio files, documents, etc., in any suitable medium or format) provided by users of the nodes 18. The control plane 12 provides a virtual market in which such content is sold between users of the nodes 18, and regulates the exchange of both virtual currency and content between the users of the nodes 18. As such, it provides a digital marketplace in which content can be traded. The central server 14 communicates with the peer-to-peer network nodes 18 using the Internet. More than one peer-to-peer network could be provided in the data plane 16, and more than one central server could be provided in the control plane 12.

The control plane 12 monitors the behavior of users of the data plane 16, and stores user account information (including virtual currency balances and user reputation rankings). The control plane 12 also provides trust between the users of the data plane 16, protects user privacy, and enforces copyrights associated with content stored at the peer-to-peer network nodes 18. As will be discussed below, the control plane 12 also provides a secure trading platform in which users of the data plane 16 can trade content. System control functions are thus performed by the control plane 12, while content transfer and storage functions are performed by the data plane 16. All content transactions between users of the data plane 16 are processed by the control plane 12. Separation of the control plane 12 from the data plane 16 allows for scalability of the system 10 to include future features, as well as to efficiently distribute copyrighted content in an efficient manner. Also, when changes to the functionality of the control plane 12 are made, or additional features are included, such changes can be implemented seamlessly without affecting operation of the data plane 16. Vice versa, the addition or removal of peer-to-peer network nodes in the data plane 16 does not affect the operation of the control plane 12. As will be discussed below, the control plane 12 executes content searching algorithms, which allow users of the data plane 16 to search for desired content, as well as advertisement matching algorithms which match advertisements to users.

The data plane 16 could also include a central server 19 for storing digital content uploaded by users of the data plane 16. The central server 19 interacts with the central server 14 of the control plane 12 to search for content, to search for advertisements, to match advertisements to users, or to transfer content items or copies of content items from one user's account to another user's account (file transactions) with appropriate rights. It is noted that more than one central server could be provided in the data plane 16. The central server 19 of the data plane 16 allows users of the peer-to-peer nodes 18 to interact indirectly with each other, wherein each peer uploads or downloads content in a classic client-server mode. Each peer could be allocated a quota of digital storage space in the central server 19. Also, the data plane 16 could be operated in a "hybrid" mode, wherein digital content is stored on both the central server 19 (in client-server mode) and the peer-to-peer nodes 18 (in peer-to-peer mode).

Importantly, the data plane 16 represents a platform or data "path" through which user data and information flows (including the hardware and software components discussed herein), as well as a repository for such data/information. The control plane 12 represents a platform (including hardware and software components which are not part of the data plane 16) which contains control, computation, and communication elements that interact with the data plane 16, as discussed below in greater detail. The present invention matches information-seekers and information holders through an economic system, and provides a system, methods, and business practices for monetizing content.

Figure 2:
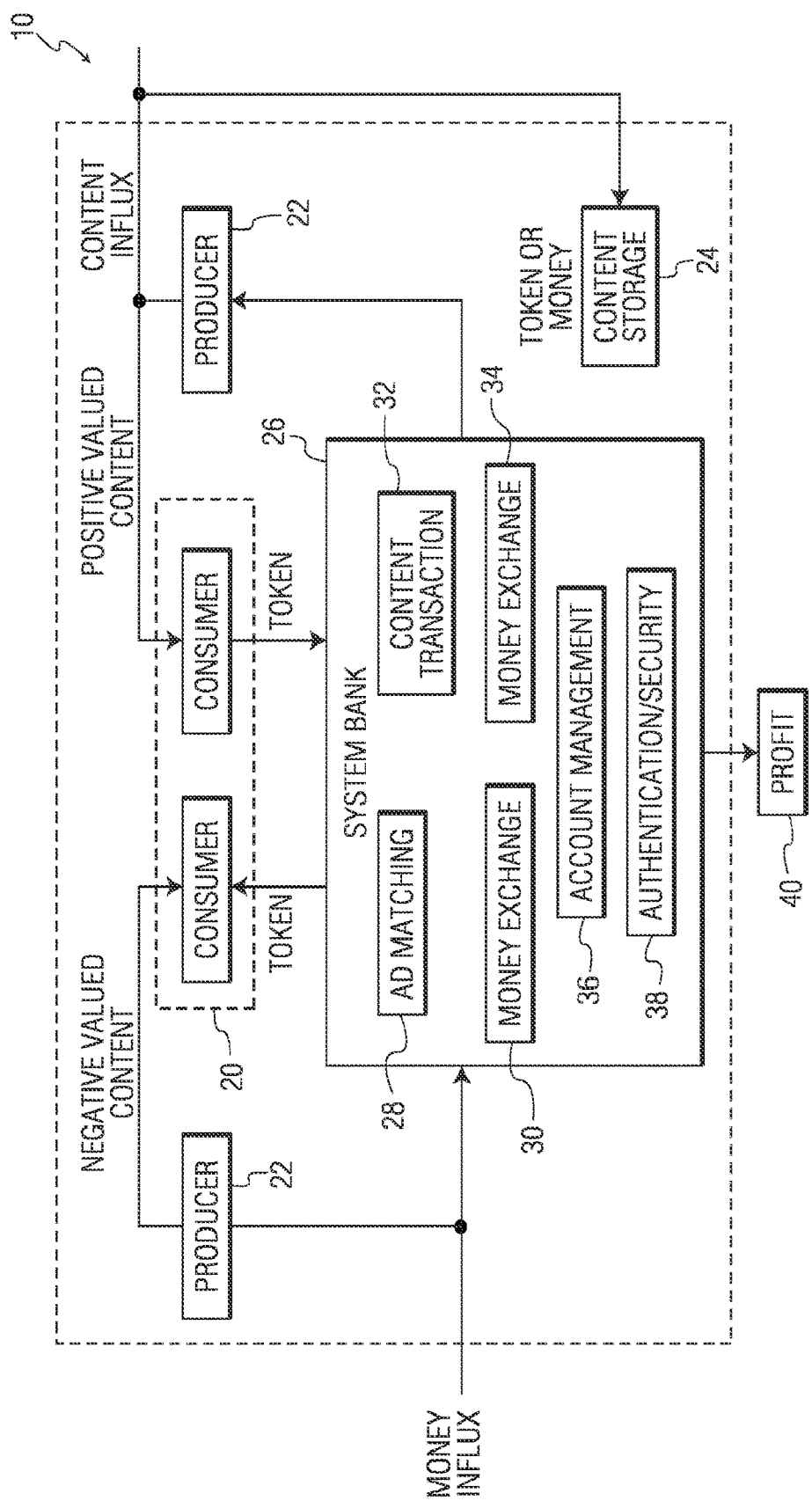
FIG. 2 is a diagram showing content and virtual currency processing functions achieved by the present invention.

FIG. 2 is a diagram showing content and virtual currency processing functions achieved by the system 10 of the present invention. Such functions are executed by the control plane 12 of FIG. 1. As shown, the system 10 transfers content created or supplied by producers 22 (which are users of the data plane 16, and include both advertisers and users who produce their own content) to consumers 20 (which are also users of the data plane 16). The present invention either "negatively" or "positively" values content, depending on the type of content. Negatively valued content includes advertisements created or supplied by users of the data plane 16 who wish to advertise products or services to other users, and positively valued content includes content created or supplied by users of the data plane 16 who wish to exchange such content with other users of the data plane 16 in exchange for virtual currency. The processing of negatively and positively valued content is discussed below in greater detail. A pre-defined quantity of virtual currency (in the form of virtual tokens or virtual money) is assigned to an item of content through a marked price transaction or through an auction process. Depending upon how the data plane 18 is implemented (i.e., central server 19 versus distributed arrangement), the content is stored in a persistent store 24 in the data plane 16 (i.e., at one or more of the peer-to-peer network nodes 18 of FIG. 1, or in the central server 19).

The control plane 12 also provides a system bank 26 which includes a number of functional modules, including ad matching module 28, money exchange modules 30 and 34, a content transaction module 32 for conducting content transactions (discussed hereinbelow), an account management module 36 for creating, storing, and managing user accounts, and an authentication/security module 38 for authenticating users and preserving system security. The bank 26 also processes all virtual currency transactions for the system 10, converts real money for virtual currency (tokens), and produces profit 40 for an operator of the system 10. By monetizing content, the present invention alleviates known problems of existing peer-to-peer networks, including "free-riders" (a situation where some users of a peer-to-peer network download content from other users, but are not willing to upload any content) and "blocked leechers" (a situation where users of a peer-to-peer network suffer from a lack of a "seeder" which has a complete copy of content, which causes users to wait an indefinite amount of time to complete a download). The free-riders problem is alleviated because the uploading of content by a user of the data plane 16 increases that users' total balance of virtual currency, thus increasing the user's buying power (and, real wealth, if the virtual currency is exchanged for real money). The blocked leechers problem is alleviated because users of the system 10 are more willing to stay connected to the system 10 to increase their virtual currency balances even if they do not download any content.

The bank 26 provides a pre-defined quantity of "start-up" or "gift" virtual currency when each user joins the system 10. Such start-up or gift tokens differ from real tokens, which are acquired by users accessing advertisement and selling content, as discussed below. For example, a user could be allocated a total of 100 tokens of virtual currency upon joining the system 10, which could be used to purchase desired content. A set of rules can be established which govern the use of such start-up virtual currency, to ensure that users do not simply join the system 10, obtain the start-up virtual currency and exchange it for real currency, and then refrain from further participation in the system 10. An example of such rules is as follows:

1. Each newly registered user obtains a standard user account, and receives a fixed number M of free gift tokens from the system 10.
2. All tokens in the system (real and gift) are set to an exchange rate f>0, which can fluctuate over time.
3. Subsequent advertisement accesses by users of the system 10 are used to compensate for the M free gift tokens. For each advertisement access, an advertisement revenue is split between the system operator and users. The fraction of advertisement revenue obtained by the system operator is equal to b, where 0<b<1. On the other hand, the fraction of the advertisement revenue obtained by users is equal to 1−b. The share of the user in advertisement revenue is transferred from the advertiser's account to the account of the user accessing the advertisement. The remaining advertisement revenue is provided to the operator of the system 10 as profit (i.e., profit 40 shown in FIG. 2). In this fashion, the advertising payment is split to protect the system 10 from losing revenue.
4. Whenever a user's real token amount accumulated by means of accessing advertisements is greater than (1−b)*M/b, the user is given an opportunity to update to a premium user account, as follows:

new account value=min(accumulated gift tokens,*M*)+accumulated real tokens

After the user is updated to a premium user account, the user can exchange tokens with real money, or the user can acquire additional tokens by selling content. Additionally, after updating to a premium user account, the user's accumulated gift tokens do not have any real monetary value if the user has already exchanged M gift tokens with real tokens.

A user can also acquire future gift tokens by selling content, and by specifying a desired number of real and gift tokens for such content. Real tokens can be used to purchase content which is sold in terms of gift tokens; however, gift tokens cannot be used to purchase content which is sold in terms of real tokens.

The above rules ensure that the system 10 does not lose profit, for the following reasons. In a worst-case situation, a user accumulates (1−b)*M/b real tokens by means of advertisements. In such an instance, the user can exchange at most M gift tokens for real tokens. On the other hand, in order for (1−b)*M/b real tokens to be accumulated by means of advertisements by this user, the system 10 will accumulate M real tokens by the advertisements accessed by this user. The operator of the system 10 is paid MY real money for these M real tokens, which is, in turn, given away when initial gift tokens are exchanged with real money. Thus, the system operator does not lose any profit.

It is noted that once the system 10 has been operating profitably for some time, the practice of providing initial gift tokens to users can be eliminated, since new users are attracted to join the system 10 by virtue of the content being sold therein. In such a situation, new users obtain their tokens only by accessing advertisements, by buying tokens from the bank 26 in exchange for real money, or by sharing their content with existing users of the system 10.

The bank 26 can adjust the total token volume in the system 10, to compensate for fluctuations in content prices over time (akin to compensating for a recession or high inflation rates in a real economy). In such situations, the bank 26 can add tokens to the system 10 according to a term structure model, $\exp(-\int_0^t r(\tau)d\tau)$, which can be used to adjust the total token volume in the system 10 at time t, where $r(\tau)$ represents the inflation rate in the system 10 at time $\tau$.

The money exchange modules 30, 34 of the bank 26 determine the token to real money exchange rate, whose parity can be set to any positive number f>0 at the initial deployment of the system 10. After deployment, f can be updated over time by the bank 26 depending on the total token volume in the system 10 and other economic factors, so that the economy of the system 10 operates smoothly and the system 10 remains attractive to existing and future users.

The account management module 36 of the bank 26 maintains an account for each user of the system 10, which is stored in the central server 14 of FIG. 1. Each account is assigned a unique user identification (ID), which is used to track the user's content sharing activities and to update the account after each transaction.

Figure 3:
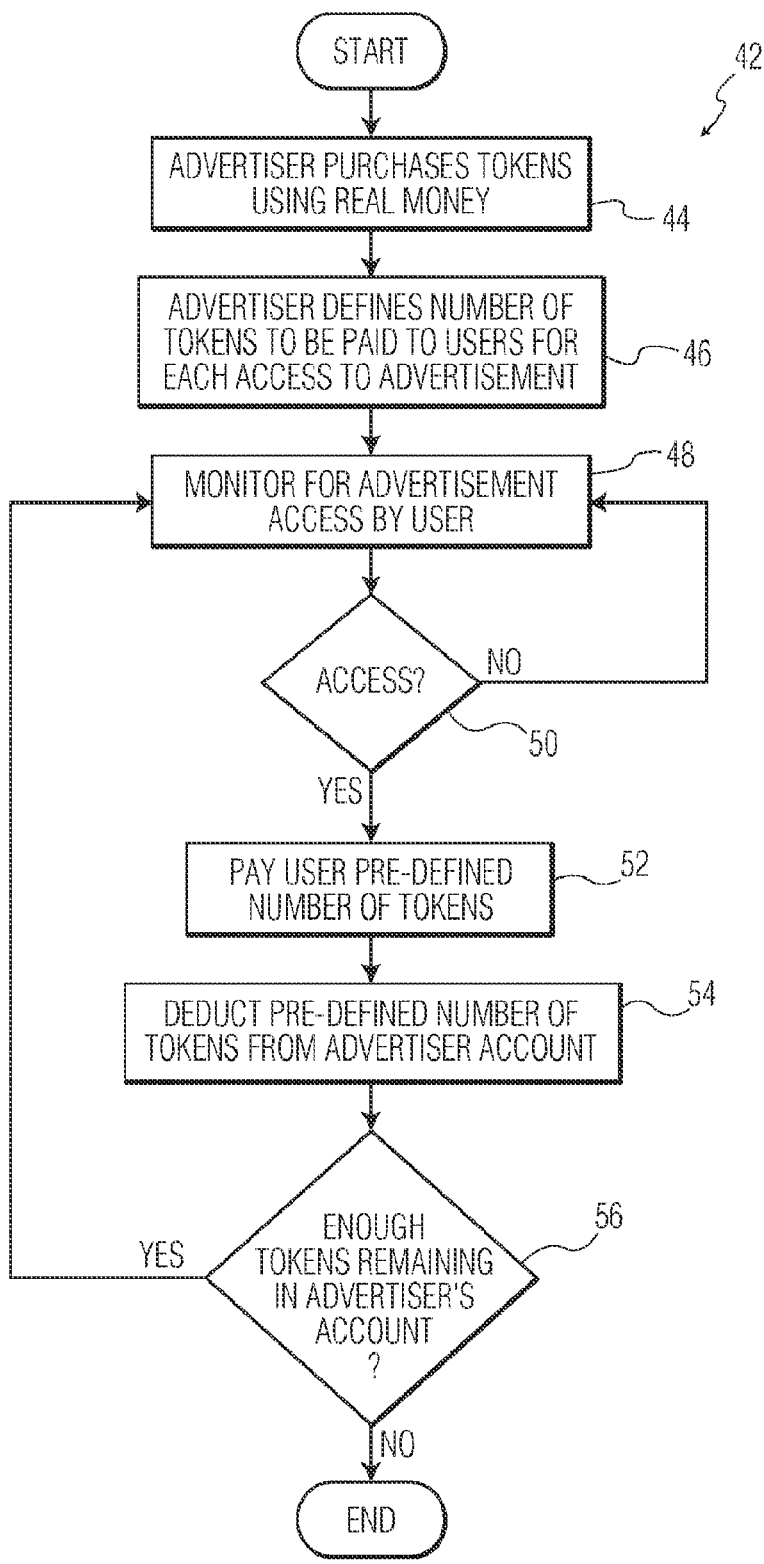
FIG. 3 is a flowchart showing processing steps according to the present invention for processing advertisements generated by users and paying users for accessing such advertisements.

FIG. 3 is a flowchart showing processing steps according to the present invention, indicated generally at 42, for processing advertisements generated by users and paying users for accessing such advertisements. As mentioned previously, advertisements are treated by the present invention as negatively-valued content, such that a negative numeric value is attributed to the item of content. This value is utilized to award tokens to users who access the advertisement, and to deduct tokens from the total number of tokens paid by the advertiser for the right to post the advertisement in the system 10. Beginning in step 44, an advertiser purchases a pre-defined number of tokens corresponding to an advertisement, using real money. The purchased tokens are stored in the advertiser's account in the central server 14 of FIG. 1. Then, in step 46, the advertiser defines the number of tokens to be paid to users for each access to a given advertisement. The number of tokens an advertiser is willing to pay per advertisement access constitutes the price of the advertisement, which is a negative value. The advertiser could be a business entity using the system 10, or an individual user. The actual advertisement (e.g., in the form of a video file, audio file, picture file, etc.) is stored on the advertiser's local machine or in the central server of the data plane, accessible by other users via the peer-to-peer network of the data plane 16 of FIG. 1.

In step 48, the system 10 monitors for access to an advertisement by a user. In step 50, a determination is made as to whether the advertisement has been accessed by a user. If a negative determination is made, step 48 is repeated so that additional monitoring for advertisement access occurs. If a positive determination is made, step 52 occurs, wherein the user who accessed the advertisement is paid the pre-defined number of tokens for accessing the advertisement. To effectuate payment, in step 54, the pre-defined number of tokens are deducted from the advertiser's account, a transaction fee for the operator of the system 10 is deducted from the pre-defined number of tokens (discussed below), and the remainder is credited to the user's account. In step 56, a determination is made as to whether enough tokens are remaining in the advertiser's account (e.g., whether the current number of tokens is equal to or greater than a pre-determined threshold). If a positive determination is made, step 48 is re-invoked; otherwise, processing ends. Thus, the present invention provides income to both the user and the operator of the present invention each time an advertisement is accessed by the user. When the advertiser no longer has any tokens remaining for the advertisement, the advertisement is discontinued by the system 10.

By paying users for accessing advertisements, the present invention provides increased content liquidity since content consumers will have sufficient token balances in their accounts to purchase desired content. Also, this encourages content generation by users (such as video clips, images, music, and other information) since there will be users of the system who can afford to purchase such content. If a user's token balance is low, a low balance indication could be provided to the user by the present invention, along with a list of advertisement links, in the user's account web page (generated by the central server 14 of FIG. 1). The user can then click on one or more of the advertisement links to view advertisements and to receive tokens for doing so, in the manner described above. This provides the user with a quick and convenient way to generate virtual income to purchase content from other users.

Figure 4:
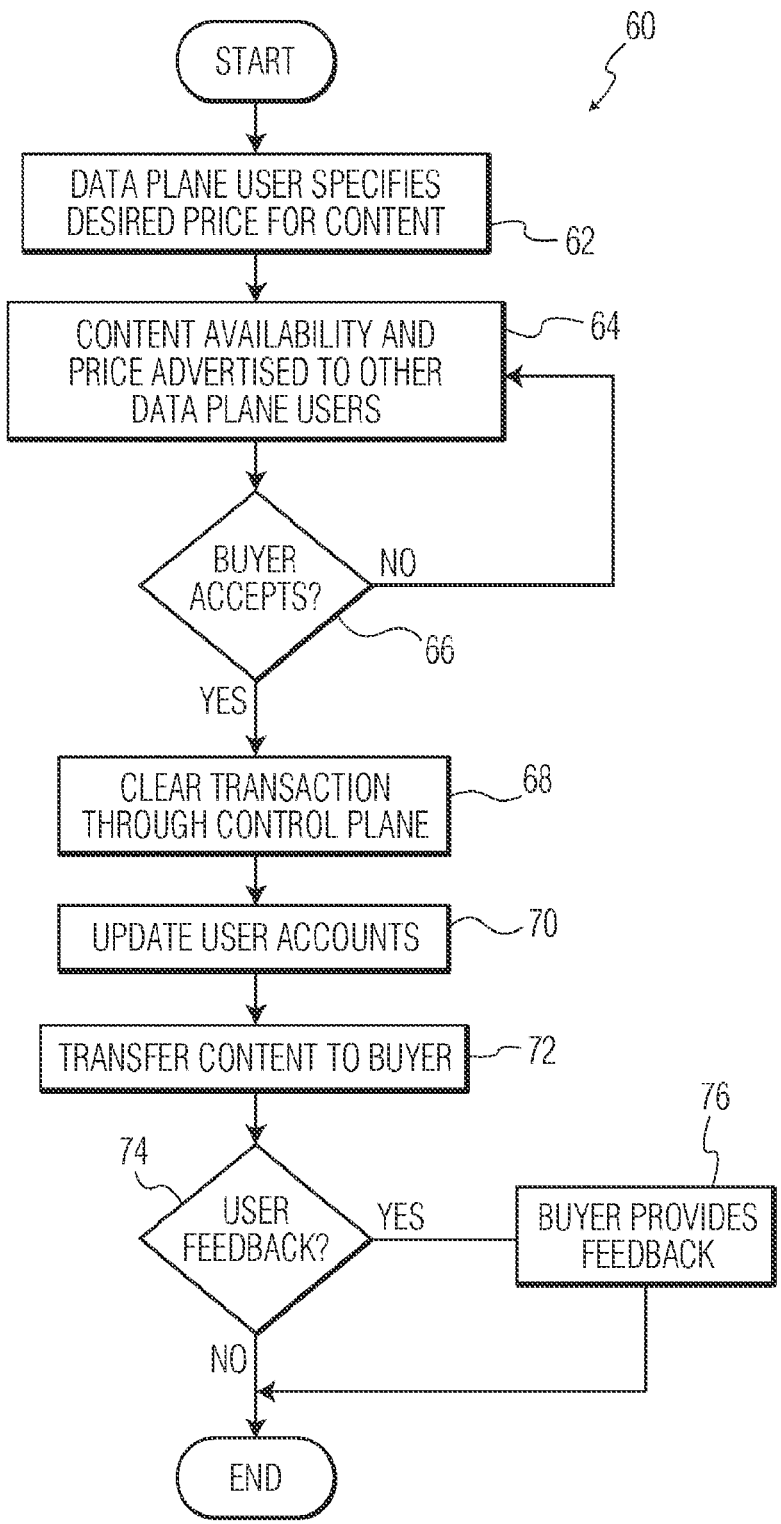
FIG. 4 is a flowchart showing processing steps according to the present invention for allowing users to sell content to other users.

FIG. 4 is a flowchart showing processing steps according to the present invention, indicated generally at 60, for allowing users to sell content to other users. As mentioned above, content which does not relate to advertising is treated by the present invention as positively-valued content, such that a positive numeric value is attributed to the item of content. In step 62, a user of the data plane 16 of FIG. 1 specifies a desired price (expressed in tokens) for an item of content stored at the user's computer (or the central server of the data plane 16), and uploads a link to such content to the central server 14 of FIG. 1. In step 64, other users of the data plane 16 of FIG. 1 are alerted to the existence of the content, and the desired price. In step 66, a determination is made as to whether a user of the data plane 16 desires to purchase the content. If a negative determination is made, step 64 is repeated. If a positive determination is made, step 68 occurs, wherein the proposed transaction is cleared through the control plane 12 of FIG. 1. That is, the present invention verifies that the proposed buyer is a legitimate user of the system 10, that the user has a sufficient number of tokens in his or her account in the system 10, and that the seller and buyer agree on the price. Once the transaction is cleared, step 70 occurs, wherein token balances of the buyer and seller accounts are updated to reflect the purchase. Specifically, the number of tokens specified by the seller is deducted from the buyer's account, a transaction fee for the operator of the system is deducted (as described below), and the remaining tokens are credited to the seller's account. After the accounts have been updated, step 72 occurs, wherein the content is transferred to the buyer through the peer-to-peer network of the data plane 16 of FIG. 1, and/or through the central server 19 (if provided, for client-server operation). By purchasing the content, the buyer acquires the right to access, resell or repackage the content.

In step 74, a determination is made as to whether the buyer wishes to leave feedback (viewable by other users of the present invention) indicating his or her satisfaction with the seller and/or the purchased content. If a negative determination is made, processing ends. If a positive determination is made, step 76 occurs, wherein the buyer provides such feedback (which could be stored on the central server 14 of FIG. 1). By providing feedback, a reputation is created for each user, which is visible to other users of the present invention. Each user's reputation affects his or her ability to sell future content (i.e., users with low reputation ratings will be less likely to attract future buyers of content), thus encouraging the user to sell high-quality content and to positively interact with buyers. This also serves to alleviate "poisoning" attacks which exist in current peer-to-peer systems, wherein a malicious user uploads content to other users which does not match the description provided by the malicious user.

Figure 5:
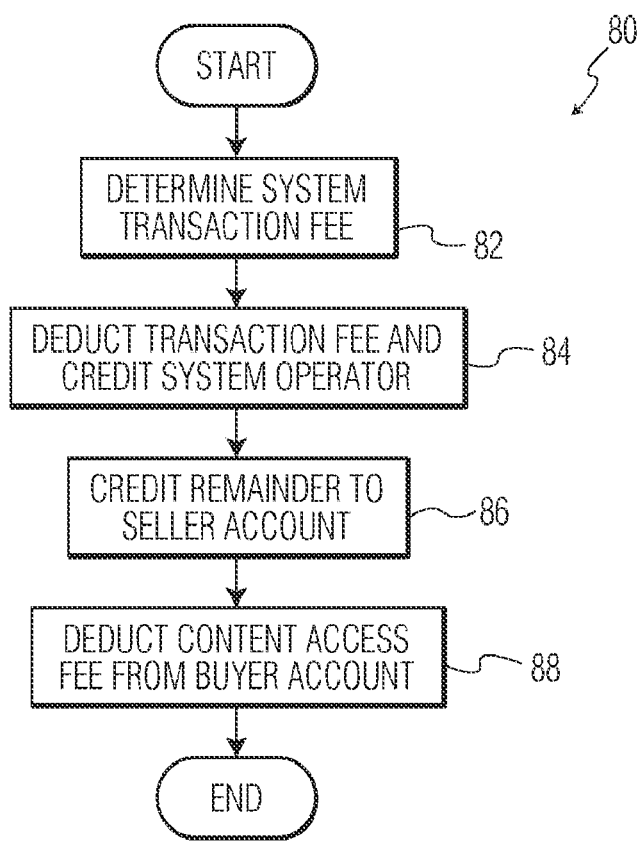
FIG. 5 is a flowchart showing processing steps according to the present invention for deducting transaction fees from content and advertisement transactions.

FIG. 5 is a flowchart showing processing steps according to the present invention, indicated generally at 80, for deducting transaction fees from content and advertisement transactions. As mentioned earlier, the operator of the system 10 of the present invention receives a transaction fee whenever an advertisement is accessed by a user and whenever content is sold from one user to another. These fees allow the operator to maintain and support the system 10, as well as to provide a source of income for the operator. Process 80 thus occurs whenever an advertisement is accessed or content is sold, as described herein. Beginning in step 82, a system transaction fee is determined. Such a fee could be a pre-determined fraction of the sale price of a piece of content. In step 84, the transaction fee is deducted from a content access fee, and is credited to the system operator. In step 86, the remainder of the content fee is credited to the seller's account. Finally, in step 88, the content access fee is deducted from the buyer's account. It is noted that the transaction fee could also be deducted whenever an advertisement is accessed by a user (in which case the transaction fee would be deducted from the advertisement access fee specified by the advertiser and paid to the operator of the present invention, with the remainder being paid to the user accessing the advertisement). Also, a flat transaction fee could be charged each time a user wishes to exchange real money for virtual currency, or vice versa.

Figure 6:
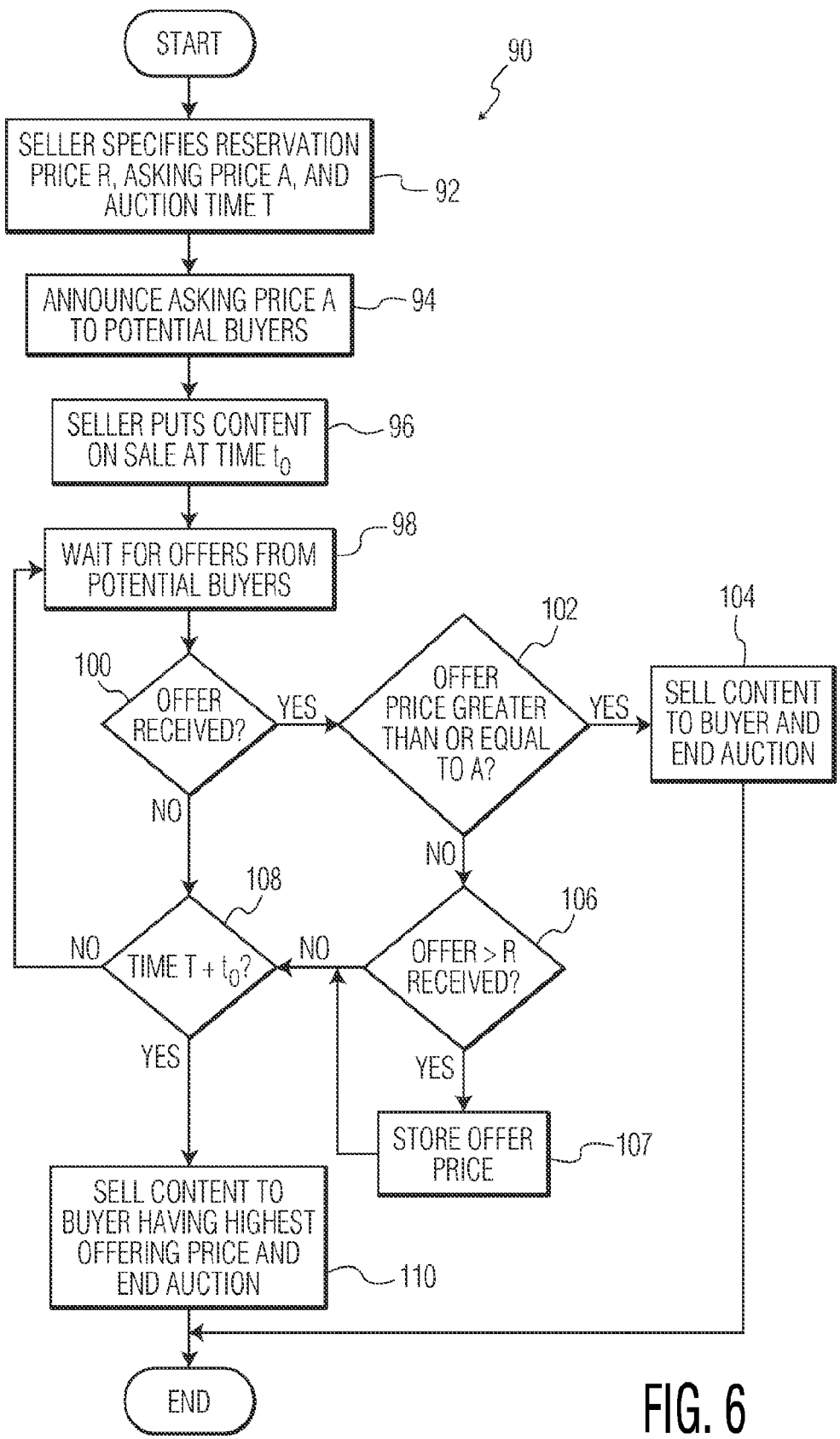
FIG. 6 is a flowchart showing processing steps according to the present invention for conducting a content auction.

FIG. 6 is a flowchart showing processing steps according to the present invention, indicated generally at 90, for conducting a content auction. Content auctions can be utilized by users to sell their content to other users of the data plane 16 of FIG. 1. Beginning in step 90, the seller specifies a reservation price R (which represents the lowest purchase price that the seller is willing to accept for the content), an asking price A (which represents a price for the content which will be advertised to other users), and an auction time T (which represents the desired length of the auction). In step 94, the asking price A is advertised to potential buyers (i.e., other users of the data plane 16 of FIG. 1). In step 96, the seller puts the content on sale at time $t_0$. Then, in step 98, the present invention waits for offers from potential buyers. In step 100, a determination is made as to whether an offer has been received from a buyer. If a positive determination is made, step 102 occurs, wherein a determination is made as to whether the offer price is greater than or equal to the asking price A. If a positive determination is made, step 104 occurs, wherein the content is sold to the buyer (in the manner described above in connection with FIG. 4), and the auction is ended. If a negative determination is made, step 106 occurs, wherein a determination is made as to whether the offer price is equal to or greater than R. If so, step 107 occurs, wherein the offer price is stored, and then step 108 occurs.

In the event that negative determinations have been made in steps 100 or 106, step 108 occurs, wherein a determination is made as to whether time $T+t_0$ has elapsed. If a positive determination is made, step 110 occurs, wherein the content is sold to the buyer having the highest offering price (in the manner discussed above in connection with FIG. 4). Then, the auction ends. If a negative determination is made, step 98 is repeated. It is noted that other types of auctions could be substituted for process 90 without departing from the spirit or scope of the present invention.

It is noted that the present invention could be programmed to distribute tokens to an author of an item of content whenever the content is sold. Such a feature acknowledges the author's copyrights to a work, and compensates the author each time content is distributed between users of the data plane 16. In such circumstances, a pre-determined fraction of the content sales price could be automatically deducted by the present invention and credited to the author's account, each time the content is sold.

Figure 7:
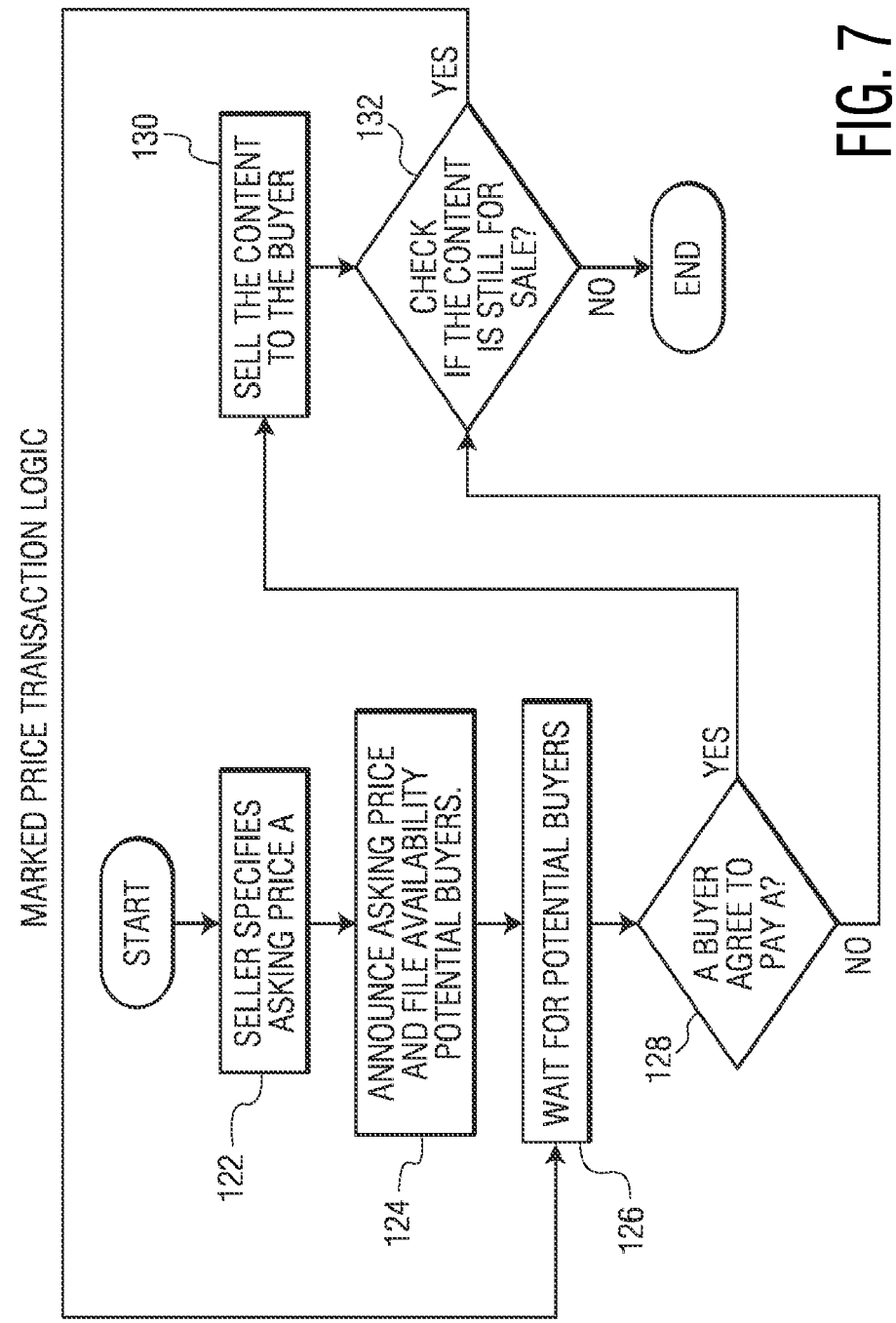
FIG. 7 is a flowchart showing processing steps according to the present invention for conducting a marked price transaction according to the present invention for selling content.

FIG. 7 is a flowchart showing processing steps according to the present invention, indicated generally at 120, for conducting a marked price transaction according to the present invention for selling content. In step 122, a seller of content specifies an asking price A. In step 124, the asking price A and availability of the uploaded content file are announced to potential buyers. Then, in step 126, the present invention waits for potential buyers. In step 128, a determination is made as to whether a buyer agrees to pay the asking price A for the uploaded content. If a positive determination is made, step 130 occurs, wherein the content is sold to the buyer. The content transaction could be cleared through the control plane, as discussed above in connection with FIG. 5. After step 130 is completed, or in the event that a negative determination is made in step 128, step 132 occurs, wherein a determination is made as to whether the content is still available for sale. If a positive determination is made, step 126 is repeated; otherwise, processing ends.

Figure 8:
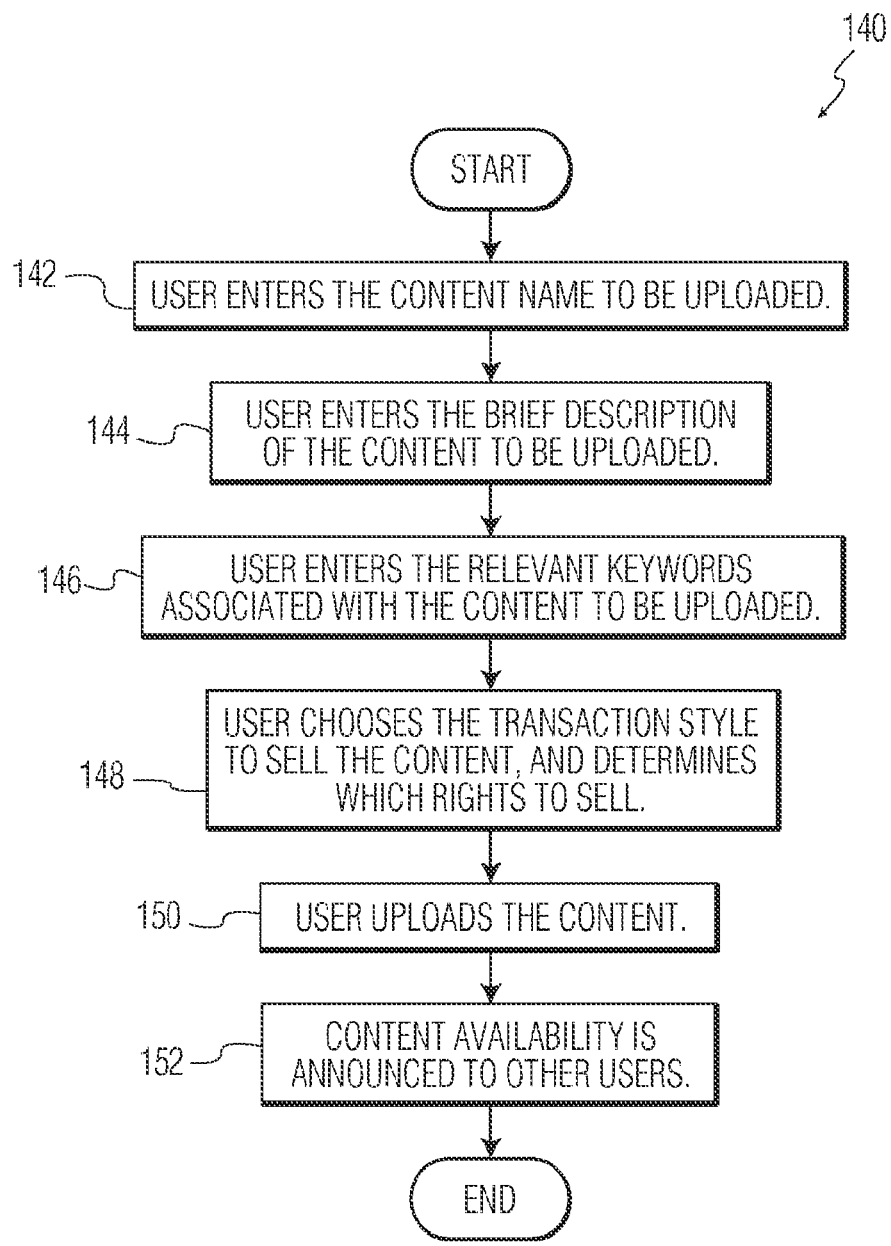
FIG. 8 is a flowchart showing processing steps according to the present invention for allowing users to upload content.

FIG. 8 is a flowchart showing processing steps according to the present invention, indicated generally at 140, for allowing users to upload content. In step 142, a user enters the name of content to be uploaded (e.g., using a web page provided by the present invention). In step 144, the user enters a brief text description of the content to be uploaded. In step 146, the user enters relevant keywords that will be associated with the content to be uploaded. In step 148, the user chooses the transaction style which will be used to sell the content (e.g., auction or marked price transaction, as discussed above), as well as rights relating to the content. In step 150, the user uploads the content. Then, in step 152, the content availability is announced to other users of the present invention.

Figure 9:
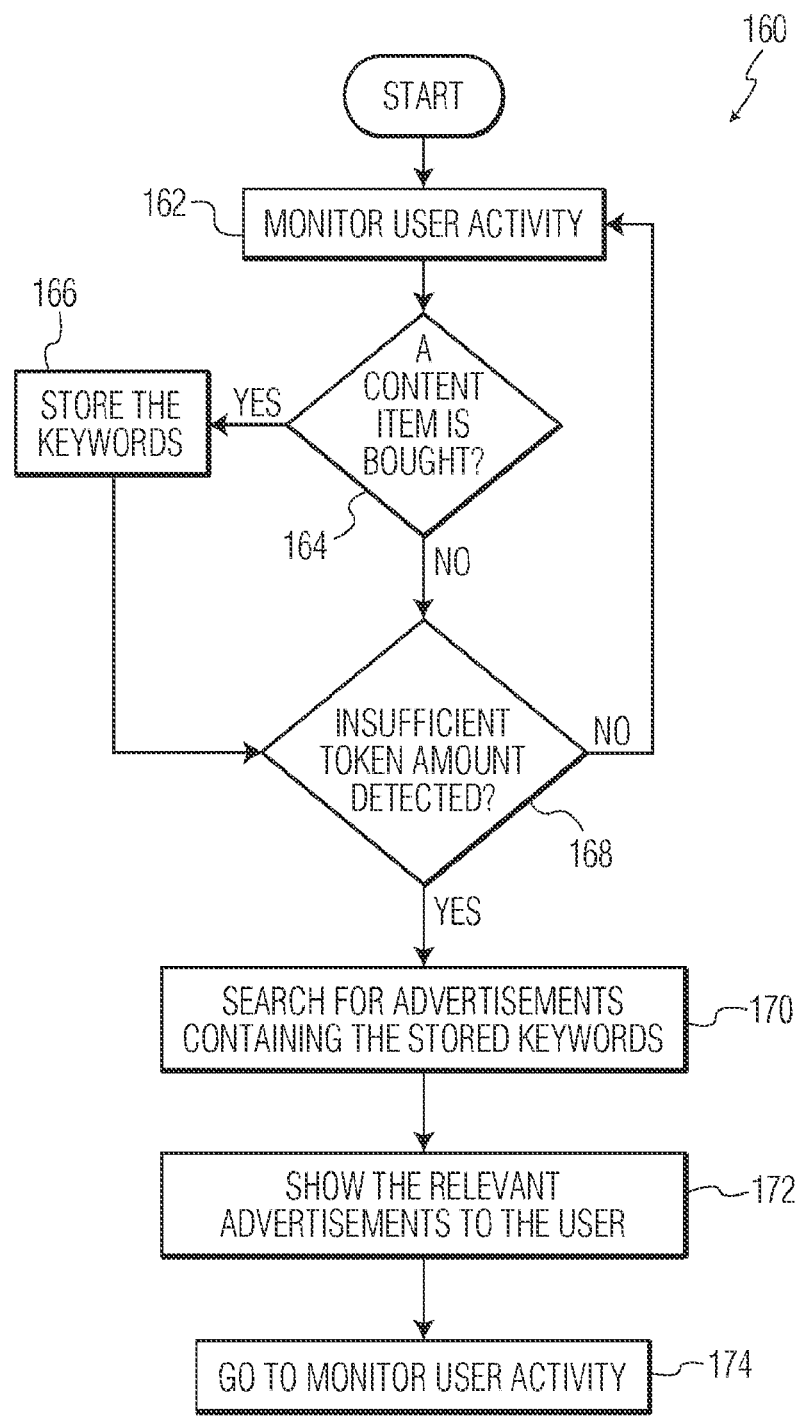
FIG. 9 is a flowchart showing processing steps according to the present invention for matching advertisements to users.

FIG. 9 is a flowchart showing processing steps according to the present invention, indicated generally at 160, for matching advertisements to users. In step 162, the present invention monitors for user activity based on the content items bought by users and by storing keywords associated with the content items. In step 164, a determination is made as to whether a content item has been bought by a user. If a positive determination is made, step 166 occurs, wherein the keywords associated with the purchased content are stored. After step 166, or if a negative determination is made in step 164, step 168 occurs, wherein a determination is made as to whether an insufficient amount of tokens are detected in the user's account (i.e., the user's token balance is below a pre-defined threshold determined by a system operator, or the user has an insufficient token balance to buy the requested content). If a negative determination is made, step 162 is repeated. Otherwise, step 170 occurs, wherein advertisements are searched using the stored keywords. Then, in step 172, relevant advertisements are shown to the user, and in step 174, user activity is monitored again.

Figure 10:
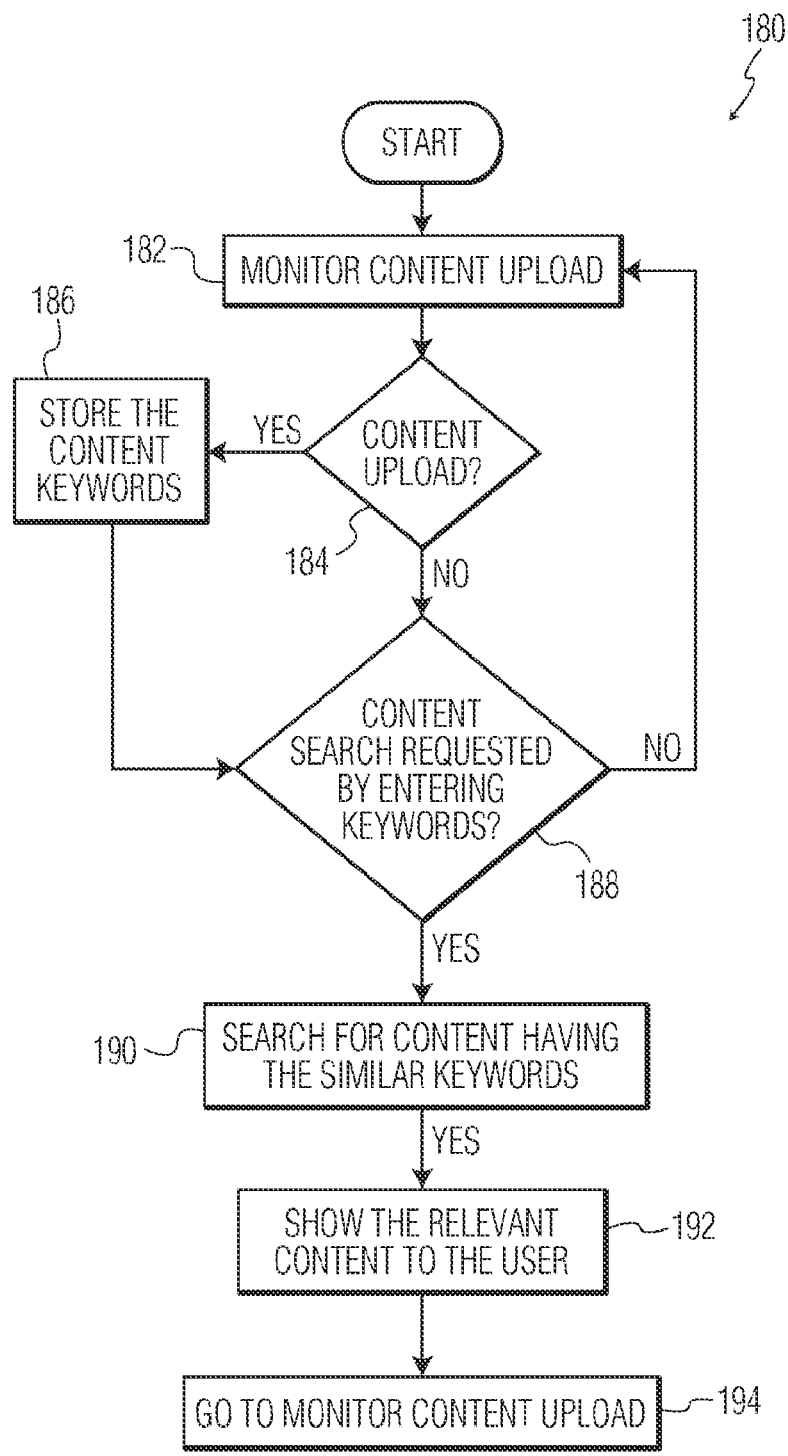
FIG. 10 is a flowchart showing processing steps according to the present invention for allowing users to search for content.

The present invention can execute known content searching algorithms to allow users to search for desired content residing on one or more of the peer-to-peer network nodes 18, or in the central server 19 of the data plane 16. Examples include, but are not limited to, the Boyer-Moore and the Commentz-Walter searching algorithms. Another example is shown in FIG. 10, which is a flowchart showing processing steps according to the present invention, indicated generally at 180, for allowing users to search for content. In step 182, the present invention monitors for uploaded content, and in step 184, a determination is made as to whether content has been uploaded. If a positive determination has been made, step 186 occurs, wherein keywords associated with the uploaded content are stored. After step 186 occurs, or in the event that a negative determination is made in step 184, step 188 occurs, wherein a determination is made as to whether a content search request has been made by a user of the present invention using keywords. If a negative determination has been made, step 190 occurs, wherein the present invention searches for content having similar keywords. Then, in step 192, relevant content is showed to the user. Finally, in step 194, the present invention monitors again for uploaded content.

Figure 11:
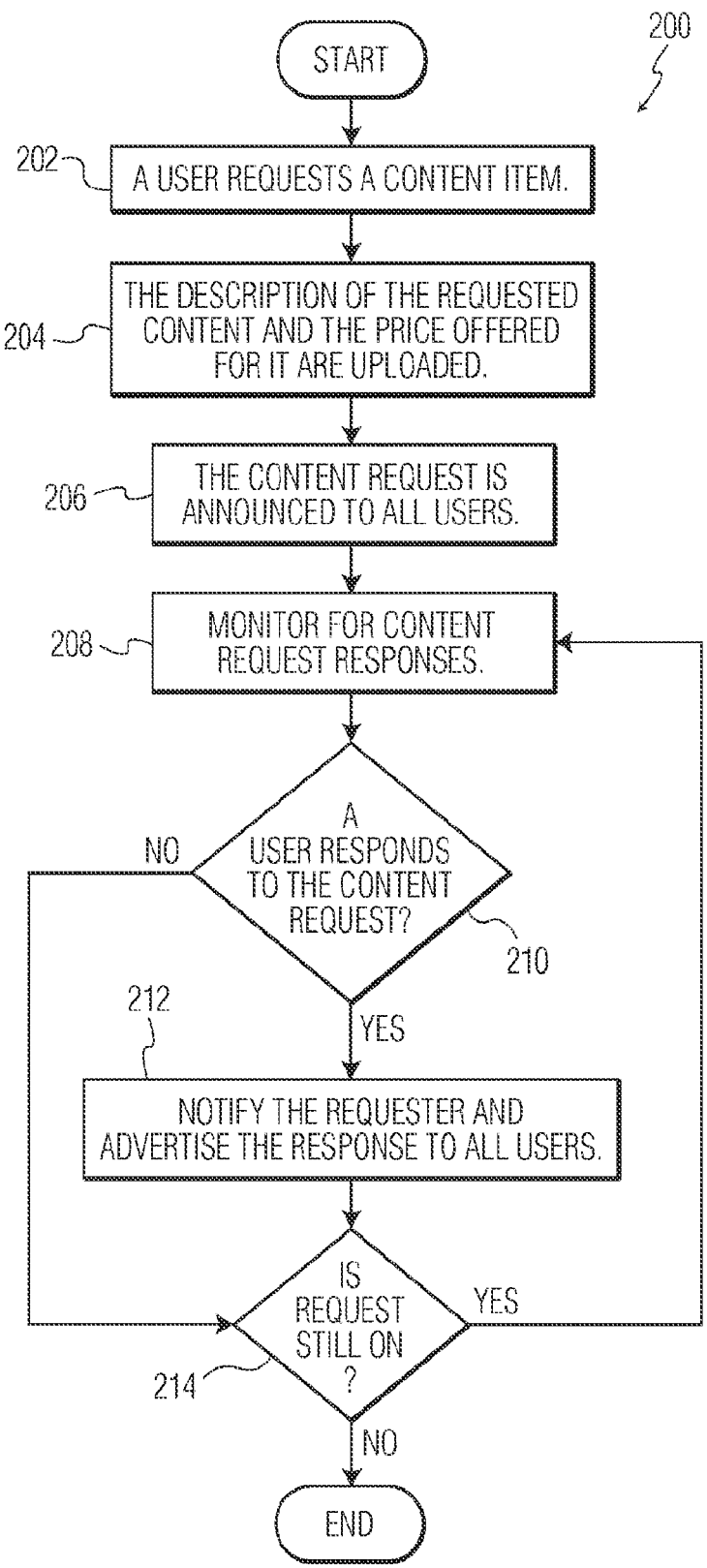
FIG. 11 is a flowchart showing processing steps according to the present invention for allowing users to formulate requests for desired content.

FIG. 11 is a flowchart showing processing steps according to the present invention, indicated generally at 200, for allowing users to formulate requests for desired content. In step 202, a user of the present invention requests a desired item of content, by providing a description of the content and a price which the user is willing to pay for the desired content. In step 204, the description of the content and the price offered is uploaded to the present invention, and announced in step 206 to all users. Then, in step 208, the present invention monitors for response to the request for content. In step 210, a determination is made as to whether a user responds to the request for content. If a positive determination is made, step 212 occurs, wherein the requester is notified of the response, and the response is advertised to all users. After step 212 occurs, or in the event that a negative determination is made in step 210, step 214 occurs, wherein a determination is made as to whether the request is still active. If a positive determination is made, step 208 is repeated; otherwise, processing ends. Importantly, the processing of FIG. 11 allows the present invention to fine-tune content that is produced by users of the present invention with content that is needed.

Figure 12:
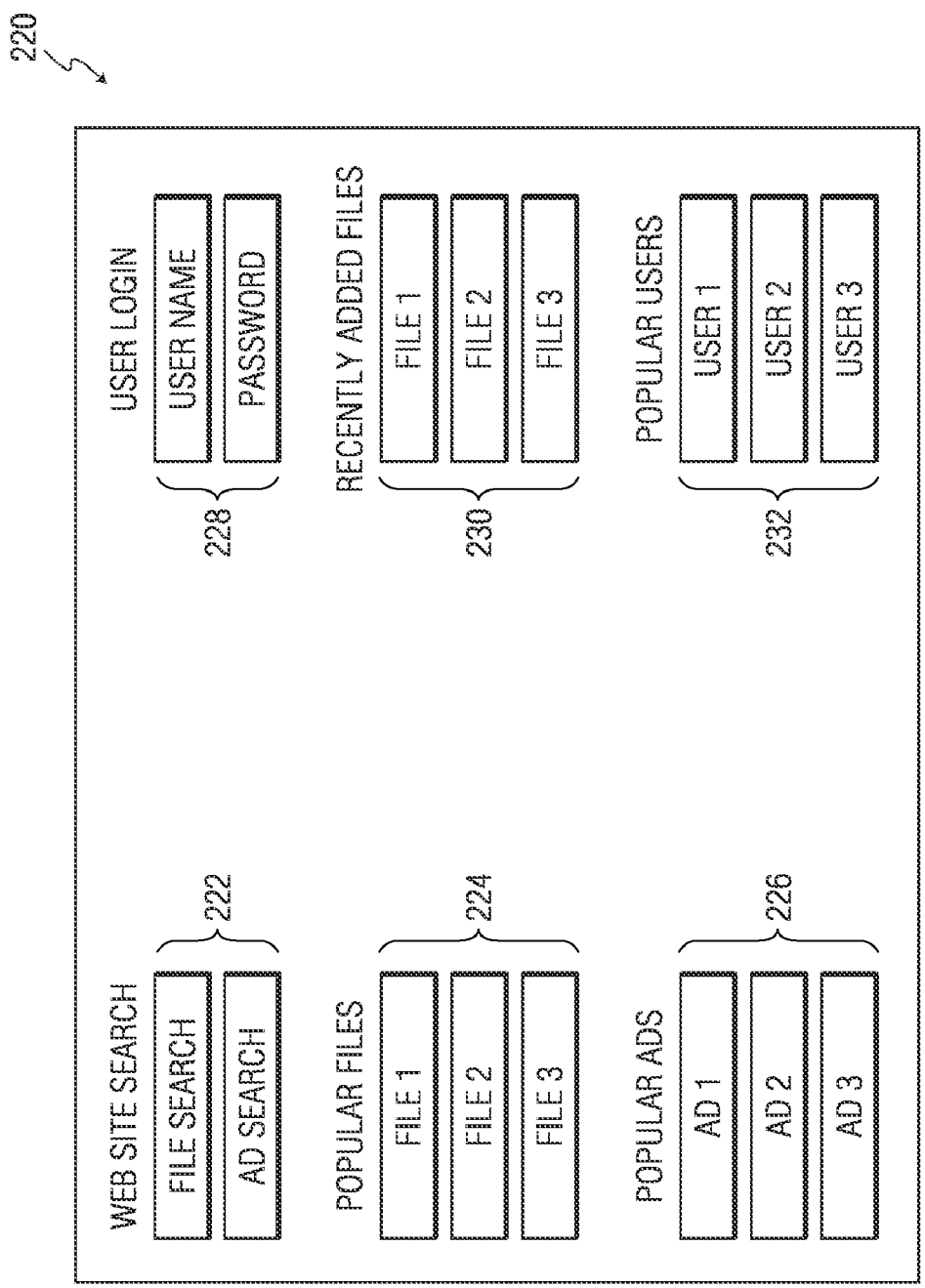
FIG. 12 is a diagram showing a main web page design according to the present invention.

FIG. 12 is a diagram showing a main web page design according to the present invention, indicated generally at 220. The main web page 220 could be generated by the central server 14 of the control plane 12, and displayed to users using a conventional web browser. The main web page 220 includes web site search fields 222 which allow the user to search for a desired content file or a desired advertisement by entering text descriptions of these items in the fields. Also provided is a popular file list 224, which lists the most popular downloads by users of the present invention, and a popular advertisements list 226, which lists the most popular advertisements viewed by users of the present invention. A user login and password fields 228 are provided for allowing the user to securely log into the present invention. A list 230 of recently added files is provided, so that the user can track recent file upload activity, and a popular users list 232 is provided, so that the user can see the most popular users of the present invention.

Figure 13:
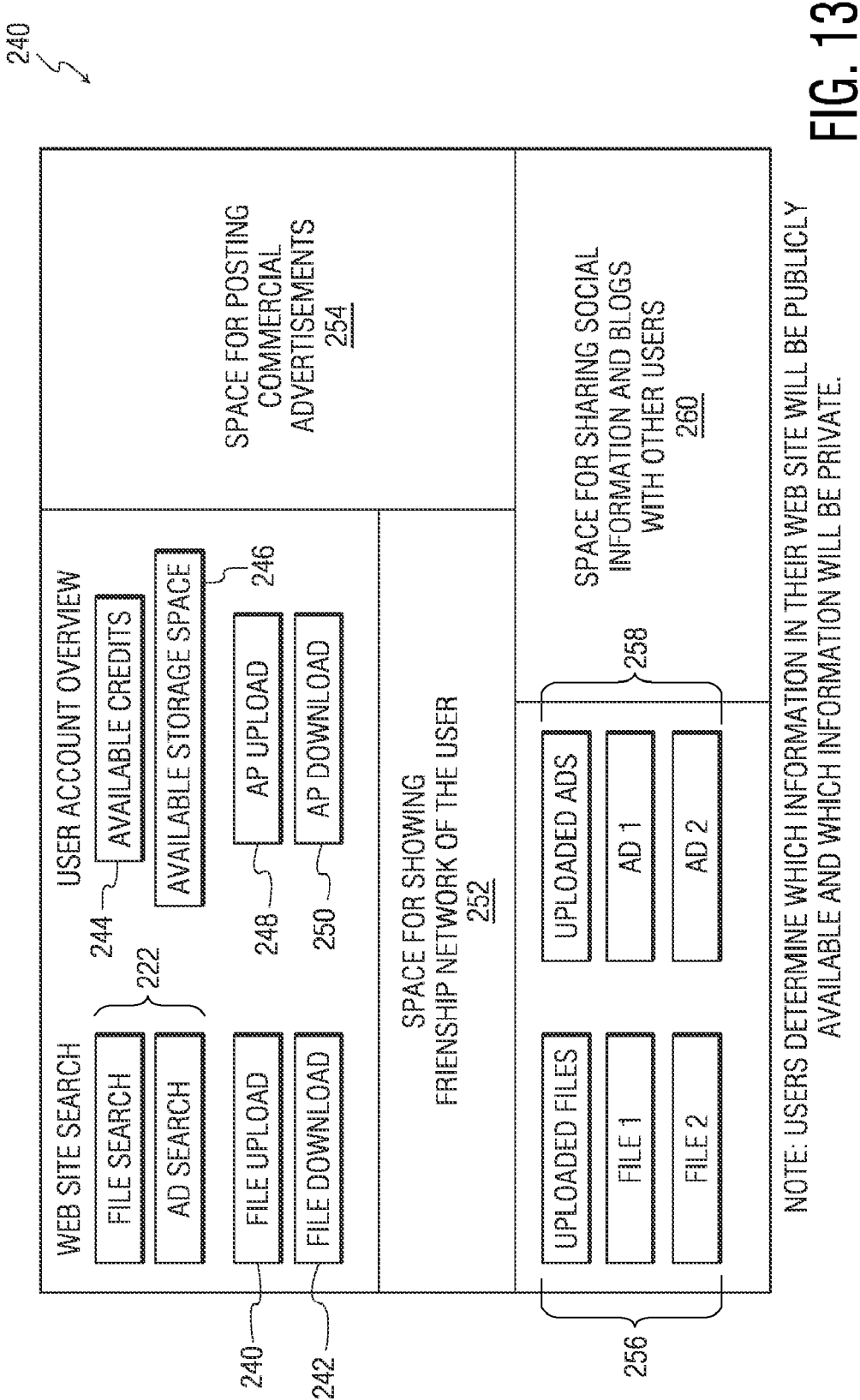
FIG. 13 is a diagram showing a personalized web page design according to the present invention.

FIG. 13 is a diagram showing a personalized web page design according to the present invention, indicated generally at 240. The personalized web page allows users to determine which information in their web site will be publicly available, and which information will be private. A user can only see the publicly available information in another user's web site, and cannot edit his or her web site (i.e., upload/download content, edit uploaded content, etc.). Included in the personalized web page 240 are the previously-discussed web site search fields 222, file upload and download buttons 240, 242, available token credit status field 244, available storage space status field 246, advertisement upload and download buttons 248, 250 (which allow the user to upload and download advertisements to/from the present invention), a display space 252 for allowing the user to view a friendship network of users of the present invention (as well as to add or remove friends from the friendship network), a commercial advertisement posting space 254, an uploaded file list 256, an uploaded advertisement list 258, and a space 260 for sharing social information and blogs with other members of the present invention. The commercial advertisement posting space 254 is provided for users to earn tokens when other users click on advertisement postings on their web sites. The system operator obtains a pre-determined fraction of the advertisement revenue generated in this way.

Figure 14:
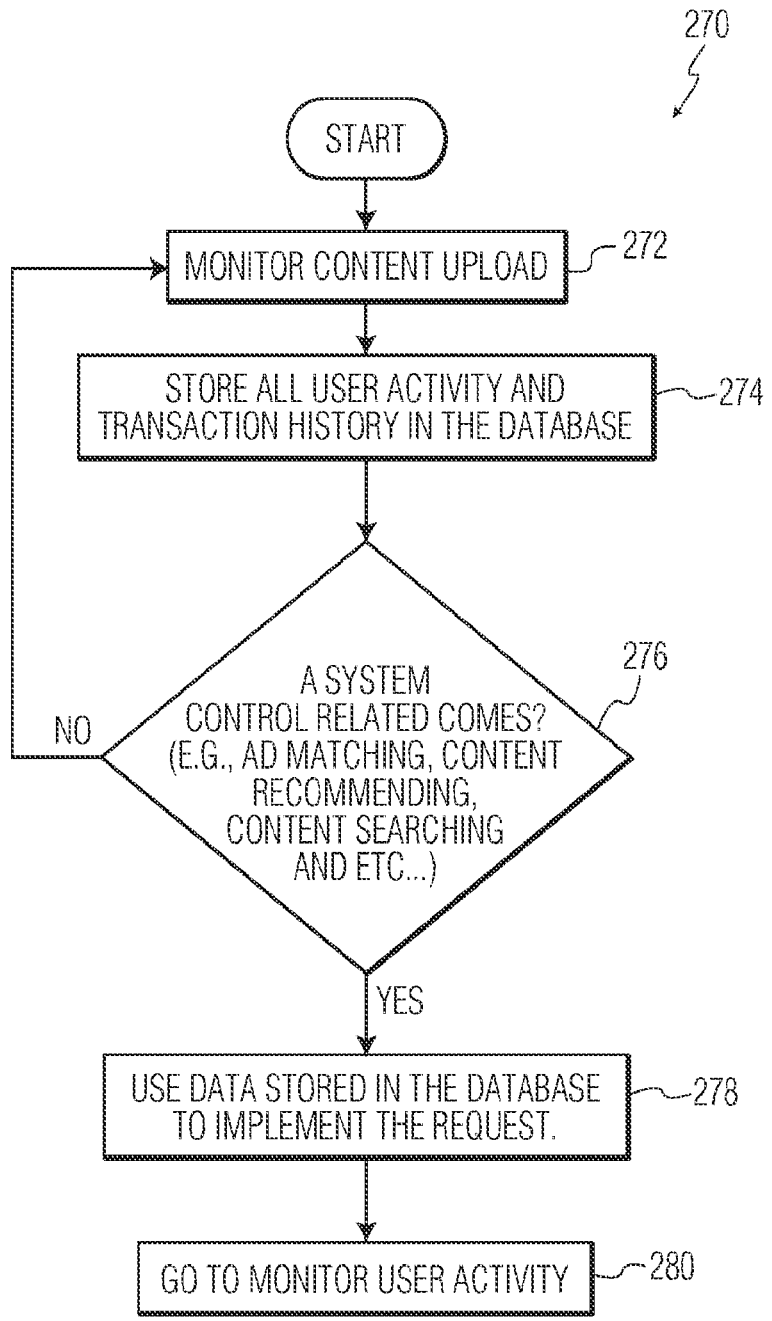
FIG. 14 is a flowchart showing processing steps according to the present invention for implementing a generic system control algorithm/protocol.

FIG. 14 is a flowchart showing processing steps according to the present invention, indicated generally at 270, for implementing a generic system control algorithm/protocol. The processing steps shown in FIG. 14 represent a generic way of handling system-related operations, such as the specific processing steps shown in FIG. 9 (advertisement-to-user matching), FIG. 10 (content searching), FIG. 15 (discussed below—content recommendations) (each of which are implemented using keyword searching). Beginning in step 272, the present invention monitors for user activity. In step 274, all detected user activity, and associated transaction histories, are stored in a database. In step 276, a determination is made as to whether a request related to a system control (e.g., advertisement matching, content recommendation, content searching, etc.) has been detected. If a negative determination is made, step 272 is repeated. If a positive determination is made, step 278 occurs, wherein data stored in the database is used to implement the system control related request. Then, in step 280, the present invention again monitors for user activity. The processing steps shown in FIGS. 9, 10, and 15 are thus specific implementations of the general logic shown in FIG. 14.

Figure 15:
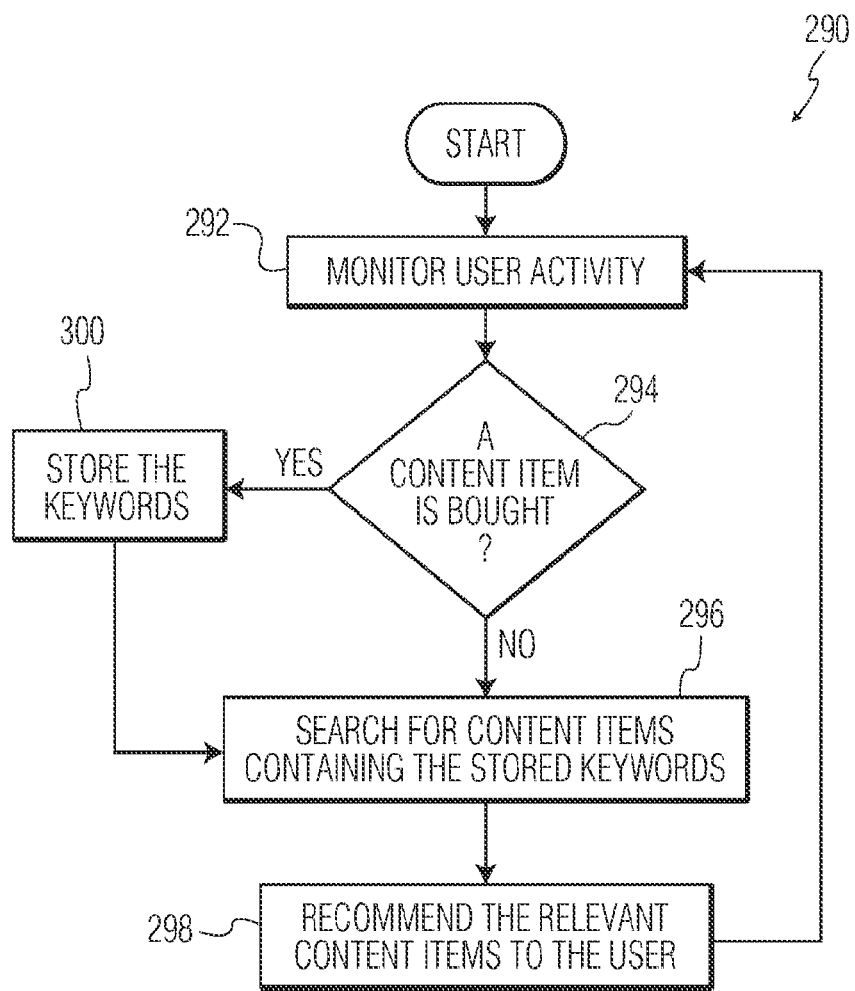
FIG. 15 is a flowchart showing processing steps according to the present invention for recommending content to users of the present invention.

FIG. 15 is a flowchart showing processing steps according to the present invention, indicated generally at 290, for recommending content to users of the present invention. Beginning in step 292, the present invention monitors for user activity. Then, in step 294, a determination is made as to whether an item of content has been purchased by a user. If a positive determination is made, step 300 occurs, wherein keywords associated with the purchased content are stored in a database. After step 300 occurs, or in the event that a negative determination has been made in step 294, step 296 occurs, wherein the present invention searches for content items which have matching keywords associated therewith. Then, in step 298, content items having matching keywords are recommended to the user, and processing returns to step 292.

The present invention could be implemented using any suitable computer hardware and software. For example, the central server 14 could comprise a HEWLETT PACKARD, SUN MICROSYSTEMS, or APPLE computer server, or any equivalent thereto, having one or more microprocessors (or, multiple-core microprocessors) and running a suitable operating system, including, but not limited to, SOLARIS, UNIX, LINUX, MICROSOFT WINDOWS, MAC OS X, etc., as well as associated web server and database applications (such as APACHE, MYSQL, etc.). The processing logic of the present invention disclosed herein could be implemented on such hardware utilizing any suitable programming language, including, but not limited to, HTML, C, C++, JAVA, etc.

Having thus described the invention in detail, it is to be understood that the foregoing description is not intended to limit the spirit or scope thereof. What is desired to be protected by Letters Patent is set forth in the appended claims.

What is claimed is:

1. A system for securely exchanging content, comprising:
a control plane including at least one server;
a data plane separate from and in communication with said control plane, the data plane including at least one server and at least two user computing nodes forming a peer-to-peer network, the data plane stores content uploaded by users of the peer-to-peer network;
the control plane authenticating users of the data plane so that only authorized users registered with the control plane are permitted to exchange content on the peer-to-peer network, a system bank alleviating free riders or blocked leechers of the peer-to-peer network of the data plane by: (i) assigning positive currency values to content uploaded to the peer-to-peer network by users of the data plane which the users desire to exchange with other users of the data plane;
and (ii) by assigning negative currency values to content uploaded to the peer-to-peer network by users of the data plane which the users desire to advertise to other users of the data plane; and
the system bank operating in said control plane, the system bank electronically processing all currency exchange transactions for users of the data plane and automatically adjusting a total volume of currency available for users of the data plane to compensate for fluctuations in content prices over time.

2. The system of claim 1, wherein the content has a copyright royalty fee associated therewith.

3. The system of claim 1, wherein the content can be sold in an auction format.

4. The system of claim 1, wherein the content is transferrable through the at least one server in the data plane.

5. The system of claim 1, wherein the data plane allows a user to view an advertisement uploaded to the system by another user.

6. The system of claim 1, wherein the currency is virtual currency.

7. The system of claim 1, wherein adding or removing nodes from the data plane does not affect operation of the control plane.

8. The system of claim 1, wherein making changes to the control plane does not affect operation of the data plane.

9. A method for securely exchanging content comprising the steps of:

providing a control plane including at least one server;

providing a data plane separate from and in communication with said control plane, the data plane including at least one server and at least two user computing nodes forming a peer-to-peer network, the data plane storing content uploaded by users of the peer-to-peer network;

authenticating, in the control plane, users of the data plane so that only authorized users registered with the control plane are permitted to exchange content on the peer-to-peer network, providing a system bank for alleviating free riders or blocked leechers of the peer-to-peer network of the data plane by: (i) assigning positive currency values to content uploaded to the peer-to-peer network by users of the data plane which the users desire to exchange with other users of the data plane; and (ii) by assigning negative currency values to content uploaded to the peer-to-peer network by users of the data plane which the users desire to advertise to other users of the data plane; and operating the system bank in said control plane, the system bank electronically processing all currency exchange transactions for users of the data plane and automatically adjusting a total volume of currency available for users of the data plane to compensate for fluctuations in content prices over time.

10. The method of claim 9, further comprising the step of assessing a copyright royalty fee against the content.

11. The method of claim 9, further comprising the step of selling the content in an auction format.

12. The method of claim 9, further comprising the step of transferring the content through the at least one server in the data plane.

13. The method of claim 9, further comprising the step of allowing a user of the data plane to view an advertisement uploaded to the system by another user.

14. The method of claim 9, wherein the currency is virtual currency.

15. The method of claim 9, further comprising the step of adding or removing nodes from the data plane while not affecting operation of the control plane.

16. The method of claim 9, further comprising the step of making changes to the control plane while not affecting operation of the data plane.

* * * * *

UNITED STATES PATENT AND TRADEMARK OFFICE
CERTIFICATE OF CORRECTION

PATENT NO. : 10,055,739 B2
APPLICATION NO. : 13/120047
DATED : August 21, 2018
INVENTOR(S) : Chiang et al.

Page 1 of 1

It is certified that error appears in the above-identified patent and that said Letters Patent is hereby corrected as shown below:

In Column 6, Line 17, "MY" should be deleted and replaced with "$M^*f$."

Signed and Sealed this
Twenty-sixth Day of February, 2019

Andrei Iancu
*Director of the United States Patent and Trademark Office*